United States Patent
Gu et al.

(10) Patent No.: US 9,794,744 B1
(45) Date of Patent: Oct. 17, 2017

(54) PHYSICAL PRESENCE VALIDATION THROUGH USE OF TIME-RESTRICTED SECURE BEACON DEVICES

(71) Applicant: SYMANTEC CORPORATION, Mountain View, CA (US)

(72) Inventors: Lei Gu, Bedford, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 124 days.

(21) Appl. No.: 14/972,636

(22) Filed: Dec. 17, 2015

(51) Int. Cl.
*H04W 4/02* (2009.01)
*H04W 12/06* (2009.01)
*H04W 84/10* (2009.01)

(52) U.S. Cl.
CPC .......... *H04W 4/021* (2013.01); *H04W 12/06* (2013.01); *H04W 84/10* (2013.01)

(58) Field of Classification Search
CPC ...... H04W 4/021; H04W 12/06; H04W 84/10
See application file for complete search history.

(56) References Cited

U.S. PATENT DOCUMENTS

| | | | |
|---|---|---|---|
| 6,658,004 B1* | 12/2003 | Kadansky | H04L 12/1827 370/394 |
| 6,868,256 B2 | 3/2005 | Dooley et al. | |
| 8,965,398 B2 | 2/2015 | Zhu et al. | |
| 9,137,771 B2 | 9/2015 | Wrappe | |
| 2015/0079942 A1* | 3/2015 | Kostka | G06Q 30/0633 455/411 |
| 2015/0133163 A1* | 5/2015 | Kitamura | G06Q 30/02 455/456.3 |
| 2016/0100311 A1* | 4/2016 | Kumar | H04L 63/123 726/7 |

OTHER PUBLICATIONS

"iBeacon security: understanding the risks", Reality matters: The Estimote Team Blog, Dec. 9, 2014, 7 pages, http://blog.estimote.com/post/104765561910/ibeacon-security-understanding-the-risks. [Retreived May 11, 2016].

* cited by examiner

*Primary Examiner* — Duc C Ho
(74) *Attorney, Agent, or Firm* — Rory D. Rankin; Meyertons, Hood, Kivlin, Kowert & Goetzel, P.C.

(57) ABSTRACT

A system and method for efficiently establishing secure mobile device communication for location-aware applications. A beacon device broadcasts encrypted packets. Each of the packets includes an indication of a respective time of broadcast. A mobile computing device, such as a smartphone, receives a packet that is broadcast from the beacon device. The mobile computing device determines the packet corresponds to a particular location-aware application and sends the packet to a server. The server determines an expected latency for the received packet based at least in part on crowdsourcing, which includes latencies of other packets sent from the same location. If the server determines the latency of the received packet is not within an expected range, the server considers the packet to be invalid.

20 Claims, 6 Drawing Sheets

PHYSICAL PRESENCE VALIDATION THROUGH USE OF TIME-RESTRICTED SECURE BEACON DEVICES

BACKGROUND OF THE INVENTION

Field of the Invention

This invention relates to the field of secure mobile device communication and, more particularly, to efficiently establishing secure mobile device communication for location-aware applications.

Description of the Related Art

Beacons are transmitter devices that broadcast signals received by mobile devices located relatively nearby. Typically, the beacons use a wireless technology for broadcasting signals. For example, beacons may use Bluetooth low energy (BLE) technology to broadcast the signal within a programmable range of 5 meters to 100 meters. The range may be an omnidirectional radius range. The signal includes at least identifiers identifying a location of the beacon that broadcast the signal. A location-aware application enabled on the mobile device that receives the broadcast signal sends information stored in the broadcast signal to a backend server. Various different devices and technologies may be used to send information to the backend server. For example, routers, switches, cellular network and the Internet may at least be used. The backend server determines whether the information is valid and sends a response to the mobile device indicating whether the information is valid. For example, the backend server may compare the received identifiers to stored valid identifiers.

If the identifiers are determined to be valid, then upon receiving the response, the location-aware application may execute one or more steps on the mobile device. The location-aware application may be used to check-in on social media, receive rewards from a company, receive notices about offers and upcoming events, and so forth. Multiple vendors have provided location-aware applications using broadcast signals from beacons. For example, a user may claim a reward upon visiting a coffee shop on a twentieth visit. The use enters the coffee shop where a beacon is placed just inside the door and the user's mobile device receives the broadcast signal from this beacon. The identifiers in the broadcast signal from this beacon are verified by the backend server. The location-aware application on the mobile device determines there is a reward to claim, such as a coupon for a free drink, and provides a notification of the reward to the user.

Although the identifiers in the broadcast signal may be rotated with a given frequency, malicious users are able to capture the information in the broadcast signal, store the information and clone the generation of the information. Thus, a malicious user can program a beacon in another location away from the source location, such as the coffee shop, and broadcast a signal that is copying, or spoofing, the original beacon. This process is also referred to as piggybacking. The backend server does not recognize the spoofed information does not correspond to the original beacon and sends a response to the malicious user's mobile device indicating the spoofed information is valid.

Proximity authentication may be used to avoid piggybacking. However, to use proximity authentication, the user's mobile device is paired with the beacon, which includes exchanging encrypted messages while authenticating the user followed by un-pairing the mobile device from the beacon. The pairing process uses an indication of approval from the user. Therefore, this solution does not scale when a relatively high number of mobile devices are waiting for authentication. In addition, the user may miss an opportunity such as a reward, offer or notification from the location-aware application as the user did not notice a prompt for approval. Another solution is to use Global Positioning System (GPS) tracking, but this information may be spoofed as well.

In view of the above, improved systems and methods for efficiently establishing secure mobile device communication for location-aware applications are desired.

SUMMARY OF THE INVENTION

Systems and methods for efficiently establishing secure mobile device communication for location-aware applications are contemplated. In various embodiments, a beacon device broadcasts multiple packets over a wireless network. In some embodiments, the wireless network is a wireless personal area network, such as Bluetooth Smart. The beacon device may be located in a restaurant, a café, a museum, a retail store, an entertainment event ticket center and so forth. Each of the packets includes an indication of a respective time of broadcast. For example, a respective timestamp based on a local time may be included in the packet. Other indications of time may be used. A mobile computing device, such as a smartphone, receives a packet broadcast from the beacon device. The mobile computing device determines the packet corresponds to a particular location-aware application and sends the packet to a backend server.

In various embodiments, the beacon device encrypts the packet prior to sending the packet. The beacon device may use at least the indication of time of broadcast when performing encryption of the packet. Therefore, the packet being broadcast may be changing relatively frequently although or more unique identifiers associated with the beacon device may or may not be rotating.

The backend server receives the packet from the mobile computing device and determines an indication of time corresponding to the received packet. The backend server may also extract the indication of time stored in the packet and determine a difference between the two indications of time. If the difference exceeds an expected latency, then the backend server may send a response to the mobile computing device indicating the received packet is invalid. In various embodiments, the high expected latency is based at least in part on crowdsourcing information from a location of the beacon device. For example, multiple people with mobile computing devices may be at the location. Each of the mobile computing devices may be sending packets received from the beacon device to the backend server.

The multiple computing devices may correspond to multiple network carriers for sending information over one or more networks. For example, a cellular network of multiple cellular networks and the Internet may be used for communication between the mobile computing devices and the backend server. In some embodiments, the backend server determines a respective expected latency for each cellular network based on latencies of packets from mobile computing devices using a particular cellular network. The latencies may be moving averages, historical absolute averages and so forth.

These and other embodiments will be appreciated upon reference to the following description and accompanying drawings.

Figure 1:
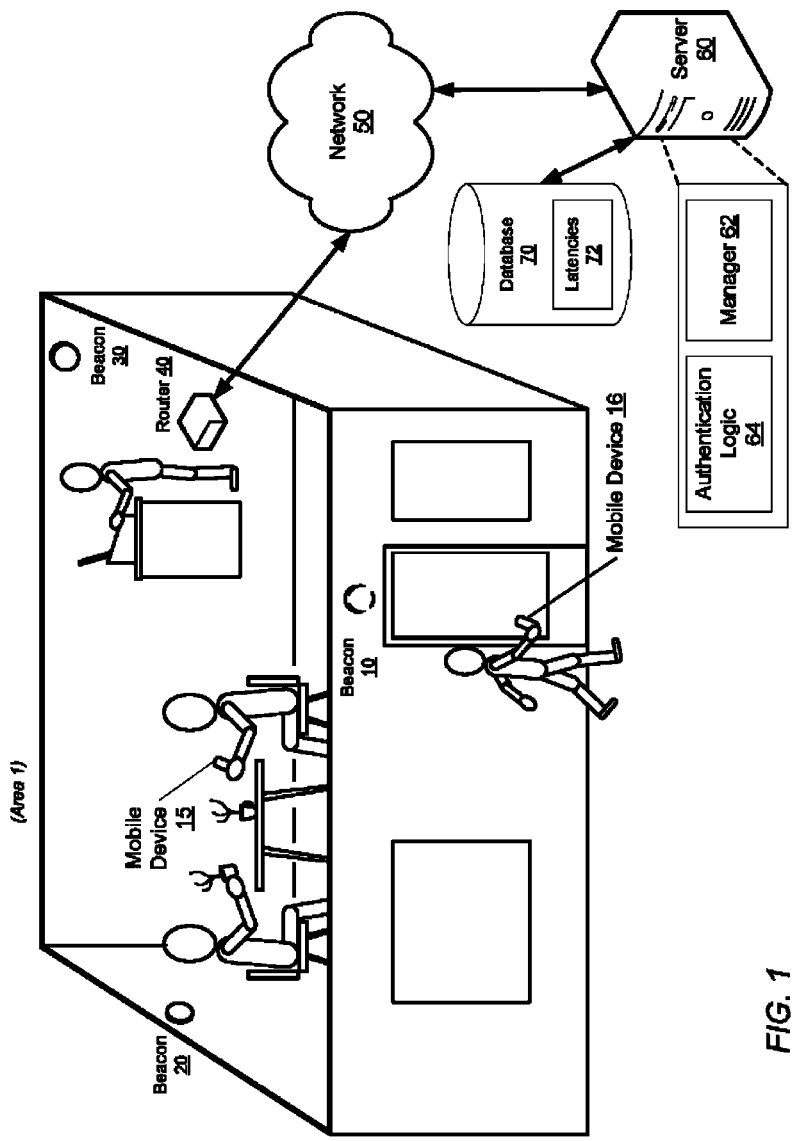
FIG. 1 is a generalized block diagram illustrating one embodiment of an area using mobile device communication.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Beacons are transmitter devices that broadcast signals typically with a wireless technology. Each broadcast signal includes a packet storing information such as at least identifiers identifying a location of the beacon that broadcast the signal. Each beacon is teamed with a destination device, such as a backend server. The backend server includes a software application, which may be referred to as a manager application, used to manage one or more beacons. For example, a user or administrator may use the manager application to determine respective identifiers for the one or more beacons, a frequency for changing the identifiers over time and conditions used for sending response to location-aware applications on mobile devices that receive the broadcast signals.

During teaming of the beacon and the manager application, a processor within the beacon may be programmed to generate encrypted packets using an indication of a local time. Programming of the beacon may occur during configuration of the beacon and the manager application, which "teams" them together. The indication of local time may be a timestamp or other indication. The manager application on the backend server receives the encrypted packet, stores an indication of time of receiving the packet, decrypts the packet and extracts the indication of local time and the identifiers stored in the packet.

After determining the identifiers are valid, the manager application may determine a received packet latency based on the indication of time for receiving the packet and the indication of time extracted from the packet. In addition, the manager application may access expected latency information corresponding to the beacon associated with the received identifiers. The expected latency information may use crowdsourcing. For example, the latency information may include relative current latencies, historical latencies, latencies grouped by network carriers for mobile devices, latencies grouped by device types of the mobile devices, a combination of these categories and so forth. The latencies may be found using computations that use absolute averages, moving averages, weighted averages, a combination of these types of averages, other formulas for determining a window of time, and so forth.

The manager application may use one or more algorithms to select which stored latencies to compare with the received packet latency. The comparison may be used to determine whether the received packet is valid. The manager application may determine whether the received packet latency fits within an expected window of latencies. Should the received packet latency be smaller than a minimum expected latency or larger than a maximum expected latency, then the received packet may be determined to be invalid. An indication of the receive packet being invalid may be sent from the backend server to the mobile device.

Figure 2:
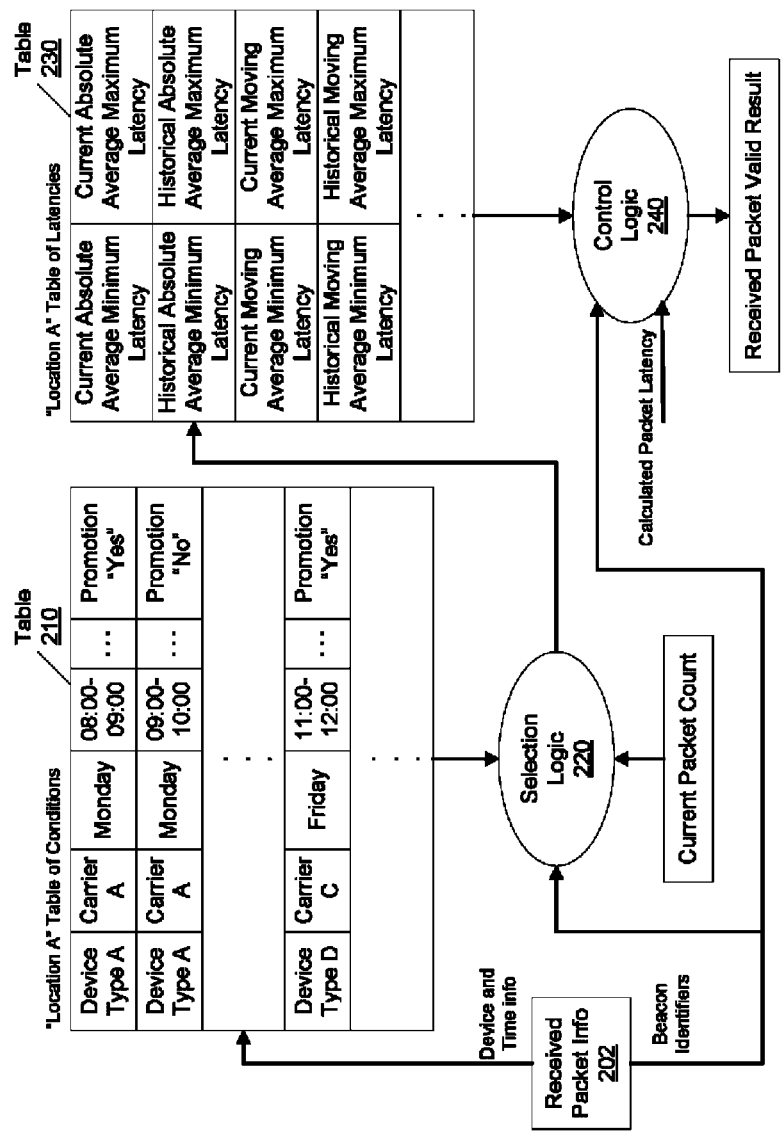
FIG. 2 is a generalized block diagram illustrating one embodiment of authentication logic for authenticating a received packet.
Figure 3:
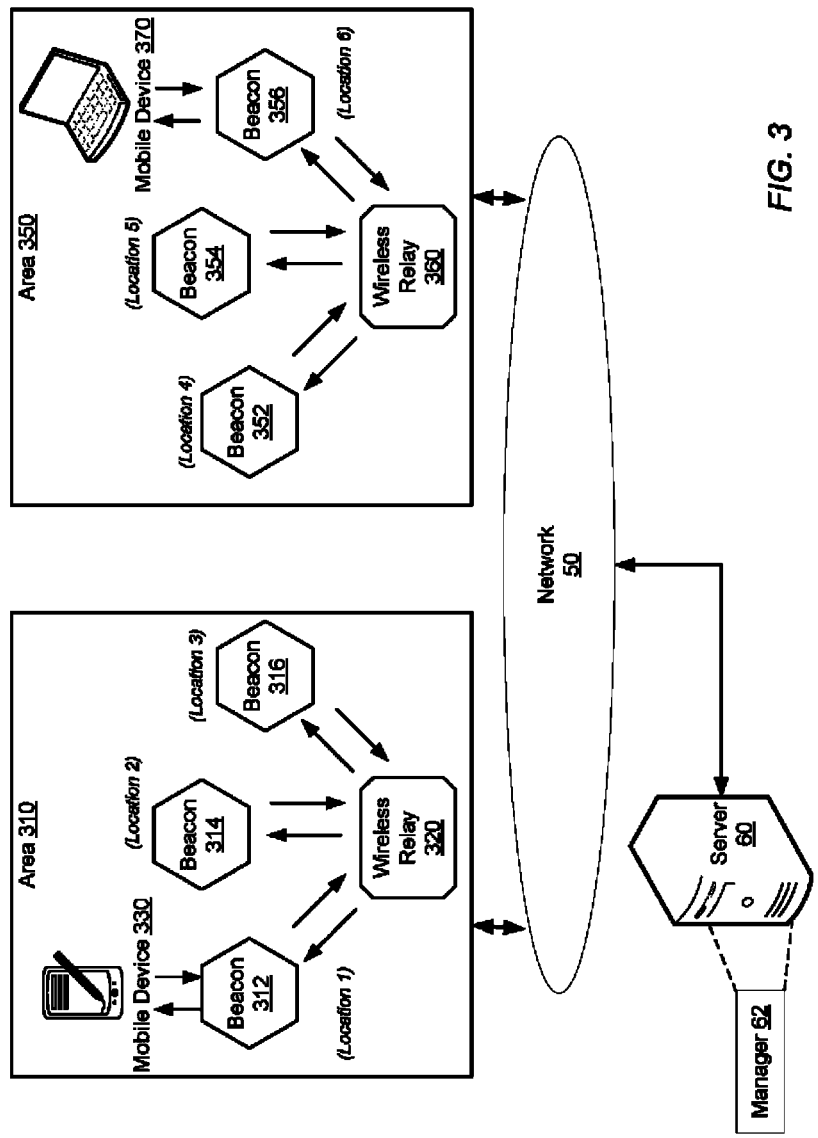
FIG. 3 is a generalized block diagram illustrating one embodiment of a system for configuring devices for mobile device communication.
Figure 4:
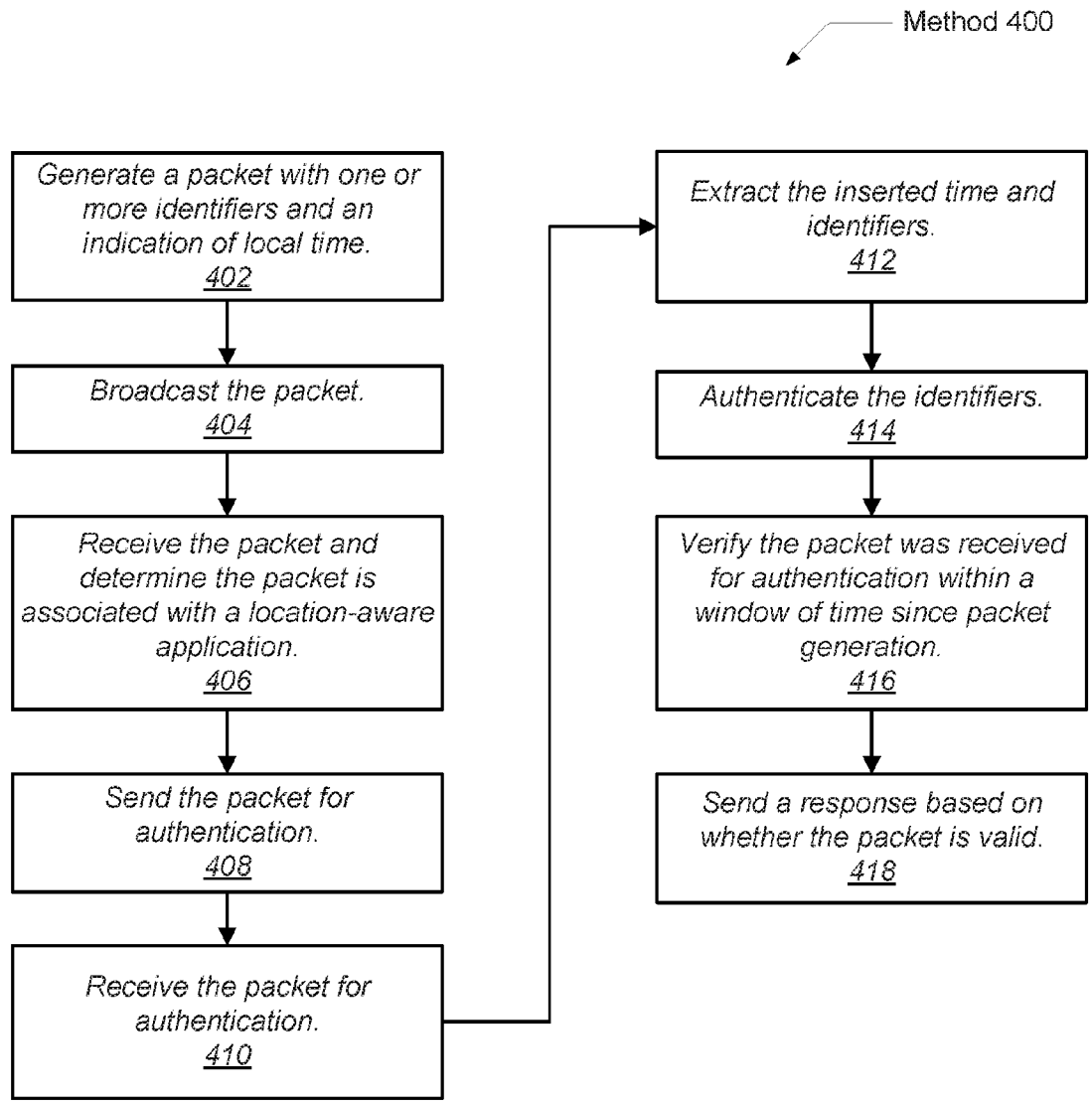
FIG. 4 is a flow diagram illustrating one embodiment of a method for establishing secure mobile communication.
Figure 5:
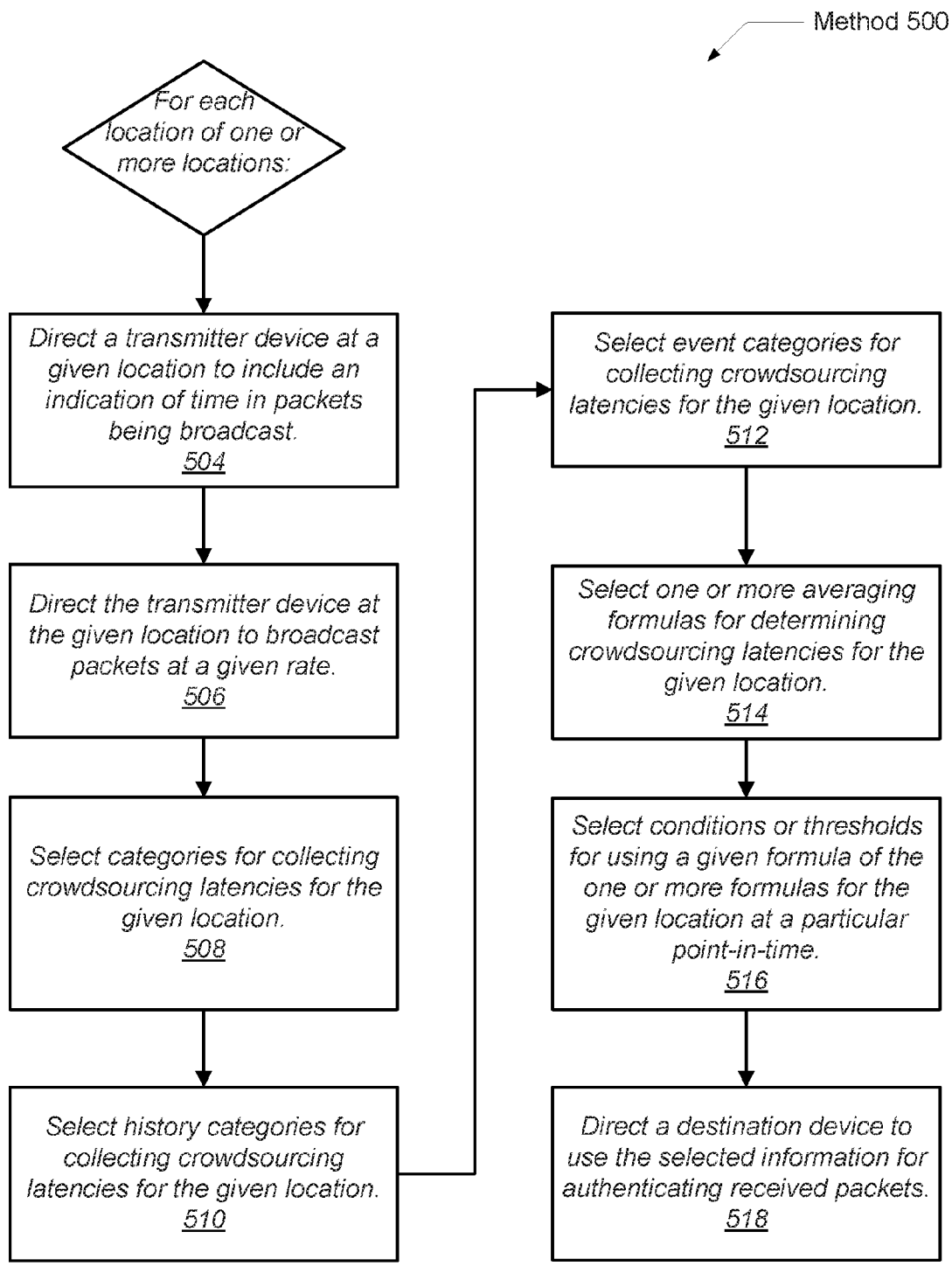
FIG. 5 is a flow diagram illustrating one embodiment of a method for configuring devices for mobile device communication.
Figure 6:
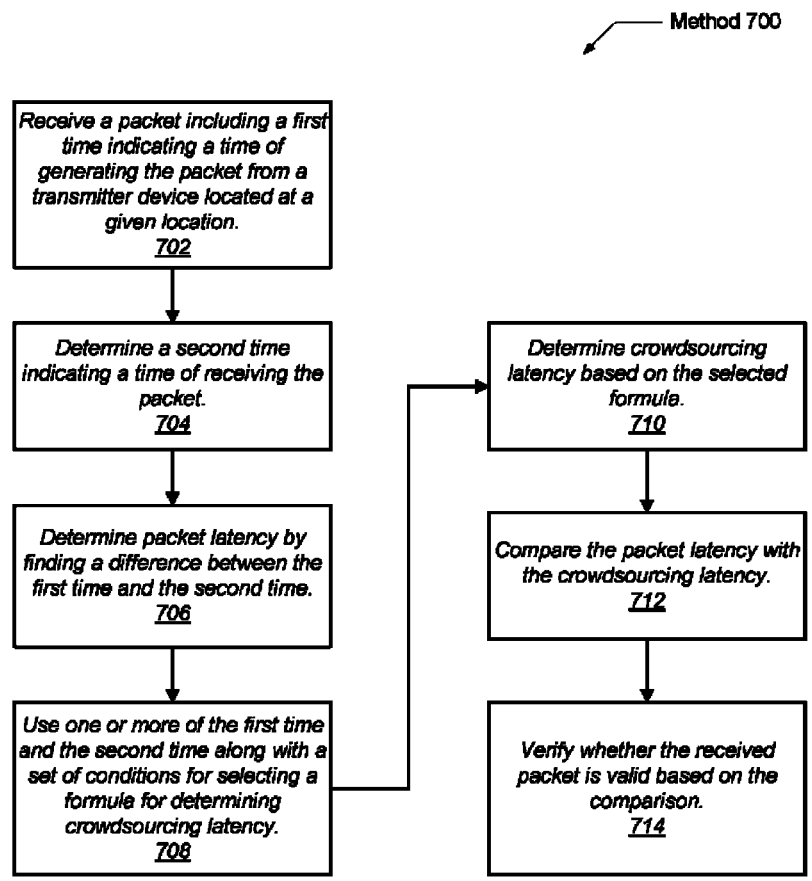
FIG. 6 is a flow diagram illustrating one embodiment of a method for authenticating a received packet.

In the following discussion, FIG. 1 illustrates an embodiment of an area using mobile device communication. FIG. 2 illustrates authentication logic for authenticating a received packet. FIG. 3 illustrates a system for configuring devices for mobile device communication. FIG. 4 illustrates a method for establishing secure mobile communication. FIG. 5 illustrates a method for configuring devices for mobile device communication. Finally, FIG. 6 illustrates a method for authenticating a received packet.

Referring to FIG. 1, a generalized block diagram of one embodiment of establishing mobile device communication is shown. In the embodiment shown, beacon devices 10, 20 and 30 are deployed in an area indicated as "Area 1," which may be a coffee shop in various embodiments. Although a coffee shop is shown, many other examples of a common area may be used, such as a stadium, one of many types of retail stores, a museum, an amusement park, a convention center, and so forth. The beacon devices 10, 20 and 30 may also be referred to as beacons 10, 20 and 30. Although only three beacons are shown in the illustrated example, any other number of beacons may be deployed in other embodiments.

Each of the beacons 10, 20 and 30 is a transmitter device. Generally speaking, each of the beacons 10, 20 and 30 includes at least a transmitting module using wireless technology for broadcasting signals, a processor, a memory, a network interface and a cell battery. In various embodiments, the wireless technology is Bluetooth low energy (BLE) technology. The wireless technology allows the beacons 10, 20 and 30 to contribute to the growth of the Internet of Things (IoT), which is a network of physical objects that exchange data via the existing Internet infrastructure.

Packets (frames) generated by the beacon are broadcast at given time intervals by the transmitting module. The packets include at least identifiers identifying the location of the beacon. The network interface may use local area wireless computer networking such as Wi-Fi, a broadband wireless communication such as IEEE 802.16 standard, and the like. The network interface may be used to configure or program the beacon. For example, firmware stored in the memory of the beacon may be updated by a manager application on a remote server or computer. The updates may be received through the network interface. In various embodiments, the processor may be a microcontroller processor such as one of the ARM Cortex-M group of processors and the like. Examples of the beacons 10, 20 and 30 include beacons using the iBeacon technology developed by Apple Inc. and beacons manufactured by XY Find It, Blue Sense Networks, Estimote, Inc., BlueCats and so forth.

Each of the beacons 10, 20 and 30 may use its network interface to communicate with the backend server 60 through the router 40. The router 40 may be a Wi-Fi router or node. The network 50 may include multiple switches, routers, cables, wireless transmitters and the Internet for transferring messages and data. In various embodiments, software applications on the server 60 are used for both configuring the beacons 10, 20 and 30 and for processing data received in packets from the beacons 10, 20 and 30. In other embodiments, a separate computer or server is used for configuration of the beacons 10, 20 and 30.

Each of the beacons 10, 20 and 30 is deployed in particular locations in the coffee shop designated as "Area 1." For example, the beacon 10 is located just inside the door of the front entrance. The beacon 20 is located in a general sitting area and the beacon 30 is located near the cashier. A smaller number of Wi-Fi routers or nodes are deployed in the area. For example, a single router 40 is shown. In some embodiments, a USB-style beacon is plugged into a USB port of the router 40. This USB-style beacon communicates with the beacons 10, 20 and 30. In other embodiments, the router 40 communicates directly with the beacons 10, 20 and 30. The router 40 may be used to transfer messages and data between the beacons 10, 20 and 30 and the server 60. The configuration steps are described later in FIG. 3.

Each of the beacons 10, 20 and 30 is configured or setup to broadcast packets (frames) at a given time interval. Each packet includes identifiers identifying a respective location of the beacon. For example, the identifiers for the beacon 10 identify the location of just inside the front door of the entrance. The identifiers for the beacon 20 identify the general sitting area. The identifiers for the beacon 30 identify the cashier back area.

The identifiers may include a universally unique identifier (UUID) along with the major and minor pair. The UUID may identify a particular group or franchise. For example, the UUID may identify a given coffee shop franchise, a given retail store franchise, and so forth. The major value or version identifies the "Area 1", such as the particular coffee shop. The major value distinguishes the particular coffee shop from other coffee shops of the same franchise. The minor value or version may be used to identify a particular location within the "Area 1," such as just inside the door of the front entrance versus the cashier back area.

In addition, each of the beacons 10, 20 and 30 may generate packets with an indication of time. In various embodiments, the indication of time is a timestamp. The indication of time may include multiple pieces of information such as one or more of a current year, a current month, a current hour, a current minute, a current second, and so forth. In various embodiments, each of the beacons 10, 20 and 30 encrypts the packets (frames) before sending them. One of various cryptographic algorithms or ciphers may be used to encrypt the packet. Further, each of the beacons 10, 20 and 30 may encrypt packets based on the indication of local time. Therefore, each of the beacons 10, 20 and 30 generates unique packets at a relatively high frequency.

As shown, mobile device 15 is already located within the "Area 1," such as the coffee shop and mobile device 16 is about to be placed within the "Area 1." Examples of the mobile devices may include smartphones, tablet computers, smartwatches, laptops and so forth. Each of the mobile devices 15-16 may include an enabled location-aware application. The location-aware application may alert the user of awards and promotions as well as provide information regarding the location of particular products being sold.

When the mobile devices 15-16 are located within a range of the broadcast of a given one of the beacons 10, 20 and 30, the mobile devices receive the encrypted packets being broadcast. In some embodiments, the location-aware application on the mobile devices 15-16 monitor a distance from a given one of the beacons 10, 20 and 30 even as the distance changes. This monitoring is referred to as "ranging." This ranging is in contrast to GPS tracking that uses latitude and longitude coordinates to identify a location.

The enabled location-aware applications on the mobile devices 15-16 may automatically wake-up when the mobile devices 15-16 are brought within the range of the beacons 10, 20 and 30 even when the location-aware application is closed. Upon receiving a packet from one of the beacons 10, 20 and 30, the location-aware application may store the packet and send later or immediately send the packet. The enabled location-aware application on the mobile devices 15-16 sends the received packet to the manager application 62 on the backed server 60. For example, a cellular network and the network 50 may be used for sending the packet.

The backend server 60 receives the packet from a given one of the mobile devices 15-16. In various embodiments, the backend server 60 records an indication of time for receiving the packet. Alternatively, the manager application 62 records an indication of time for being notified of the received packet. In yet other embodiments, both indications of time are recorded. In yet further embodiments, multiple indications of time may be recorded for the packet, such as a time of generating the packet on one of the beacons 10, 20 and 30, broadcasting the packet from one of the beacons 10, 20 and 30, receiving the packet at one of the mobile devices 15-16, sending the packet from one of the mobile devices 15-16, receiving the packet at the server 60 and notifying the manager application 62 of the packet. These multiple indications of time may be used to calculate multiple latency values used to determine whether the packet is valid.

If the received packet is encrypted, the server 60 decrypts the packet. As each of the beacons 10, 20 and 30 are "teamed up" during configuration or setup with the manager application 62, the manager application 62 can determine which indication of time to use as a key for decryption. Information within the packet may be extracted prior to sending to the manager application 62 or the manager application 62 extracts the information. The extracted information may include one or more indications of time, such as multiple timestamps, and the identifiers used to locate a particular beacon of the beacons 10, 20 and 30.

The manager application 62 may compare the extracted identifiers to stored valid identifiers. If there is no match, then the packet may be deemed invalid. If there is a match, then the manager application 62 may find a difference between two or more indications of time corresponding to the receive packet. For example, the manager application 62 may find a difference between the indication of time inserted in the packet by a given one of the beacons 10, 20 and 30 and the indication of time the server 60 received the packet. Other differences may also be determined by the manager application 60 for the received packet. In various embodiments, the authentication logic 64 determines the differences. In other embodiments, the functionality of the authentication logic 64 is incorporated in the manager application 62.

Following the determining of one or more latencies for the received packet, the manager application 62 may access data corresponding to the identifiers extracted from the received packet. In various embodiments, this data is stored in the database 70 as latencies 72. The stored data may include at least expected latency information collected by multiple mobile devices at the location of the beacon associated with the identifiers. The expected latency information indicates a duration of time for a packet to be transferred between two points, such as from beacon 20 to server 60 through at least mobile device 15 and network 50. The stored expected latency information 72 may include current latencies relative to the received indication of time and historical latencies over one or more time periods. This expected latency information may be based on crowdsourcing at the location of a given beacon.

The manager application 62 or the authentication logic 64 compares the determined latency for the received packet to a stored expected latency from the latencies 72. A further description of these steps is provided in FIG. 2. If the authentication logic 64 determines the determined latency is below a maximum threshold indicated by the stored expected latencies, then the authentication logic 64 may determine the received packet is valid. In other embodiments, the authentication logic 64 additionally compares the determined latency for the received packet to a minimum threshold indicated by the stored expected latencies. If the authentication logic 64 determines the determined latency is above the minimum threshold, then the authentication logic 64 may determine the received packet is valid. Following, the authentication logic 64 generates a response to send to a given one of the mobile devices 15-16 indicating whether the received packet is valid.

If the packet is determined to be valid, the manager application 62 may provide additional information in the response for the location-aware application on a given one of the mobile devices 15-16 to use. For example, the manager application 62 may include notifications, coupons, awards, audio/video files, a Web address such as a URL, and so forth. The response is sent from the server 60 to the given one of the mobile devices 15-16.

Turning now to FIG. 2, a generalized block diagram of one embodiment of authentication logic for authenticating a received packet is shown. As shown, the received packet information 202 is used to index the table 210. The received packet information 202 may include at least one or more indications of time, a device identifier identifying a type of mobile device such as a brand, a model and a version, and beacon identifiers. Each entry of the table 210 may store mobile device information such brand, model and a version identifiers, an indication of a network carrier provider, a data rate plan for the mobile device, and time information such as a time slot within the day, a day of the week, a month of the year and so forth. In addition, each entry may store conditions such as whether promotions are valid corresponding to the information stored in the entry. Various other examples of information to store in the entries are possible and contemplated. The entry identified by indexing into the table 210 has its corresponding information read out and provided to the selection logic 220.

The selection logic 220 uses at least the information provided by the indexed entry in table 210. Additionally, the selection logic 220 may use other information such as a current packet count and the beacon identifiers stored in the received packet. For example, a packet may be received when a given coffee shop, retail store, or other is relatively empty. The current packet count may be relatively low or below a given threshold. Therefore, historical information may be used to determine an expected latency to use for authentication rather than current information based on packets currently received. Other qualifiers are possible and contemplated. The selection logic 220 may be programmed by a user in the manager application 62 shown earlier.

The output of the selection logic 220 indexes into the table 230. In the embodiment shown, each entry of the table 230 stores either absolute average latencies or moving average latencies. In addition, each entry stores either current latencies or historical average latencies. Weighted average latencies may also be used. Various other categories of average latencies are possible and contemplated. The latencies stored in the table 230 may be updated after a packet is received and authenticated to be valid. The formulas used to determine the latencies to store in the table 230 may be programmed by a user in the manager application 62 shown earlier. The entry identified by indexing into the table 230 has its corresponding information read out and provided to the control logic 240.

The control logic 240 uses at least the information provided by the indexed entry in table 230. Additionally, the control logic 240 may use other information such as a calculated packet latency. For example, the calculated packet latency may be the latency for a packet to be transferred from a beacon to the backend server or computer hosting a manager application performing the authentication. At least the indication of time corresponding to the packet being generated by the beacon and the indication of time corresponding to the server receiving the packet are used. Other indications of time and other latencies may also be used. The table 230 may be indexed multiple times with each result being sent to the control logic 240.

The control logic 240 may compare the received calculated packet latency with the latency values read out from the table 230. For example, the control logic 240 may determine whether the calculated packet latency is between the minimum and maximum values read out from the table 230. Alternatively, the control logic 240 may determine whether the calculated packet latency is below the maximum value read out from the table 230. In some embodiments, multiple calculated latencies are compared to one or more read out values from the table 230. A combination of the comparison results may be performed. The comparison may be programmable logic. Following, the control logic 240 generates a response indicating whether the received packet is valid.

Referring now to FIG. 3, a generalized block diagram of one embodiment of a system for configuring devices for mobile device communication is shown. Control logic and circuitry used again are numbered identically. In the embodiment shown, two areas 310 and 350 are connected to server 60 through network 50. Each of the areas 310 and 350 may correspond to separate retail stores, coffee shops, areas of a stadium, areas of a convention center and so forth. In the example where each of the areas 310 and 350 are separate retails stores of a same franchise, each of the beacons 312-316 and 352-356 may use a same UUID as each is used in a same franchise. However, the area 310 uses a different major value or version than the area 350.

Each of the beacons 312-316 uses a same major version, which identifies the particular retail store in which they are located, but their major version is a different value used by each of the beacons 352-356, which are located in a different store indicated by area 350. Each of the beacons 312-316 uses a different minor version from one another. The minor version may indicate a different location within the retail store, such as just inside the front entrance door, a back area, a cashier area and so forth. Similarly, each of the beacons 352-356 uses a different minor version from one another.

Each of the areas 310 and 350 uses at least one wireless relay, such as relays 320 and 360. The relays 320 and 360 may be used as router 40 described earlier. The relays 320 and 360 may be used to transfer information between the beacons 312-316 and 352-356 and the manager application 62 on server 60. For example, the manager application 62 may update the firmware in each of the beacons 312-316 and 352-356. In addition, each of the beacons 312-316 and 352-356 may send status information indicating a remaining battery level and other information.

A user may use the manager application 62 to setup or configure the broadcast intervals on each of the beacons 312-316 and 352-356, update the identifiers, update an encryption algorithm to use, update the rate of rotation of the identifiers and what granularity of local time to use for encryption, and so forth. These updates may be the same for each of the beacons 312-316 and 352-356, different for each of the beacons 312-316 and 352-356, or a combination as the user desires. Therefore, the user may program the configuration of the beacons 312-316 and 352-356 as well as the authentication logic used to authenticate packets from a remote server or computer. The manager application 62 may be a Cloud-based, a Web-based or a local-based application. Current examples of beacon management software include management software from Kontakt.io, Inc., Perples, Inc., and Blue Sense Networks. However, these management software packages do not provide the configuration and authentication features described above.

Turning now to FIG. 4, one embodiment of a method 400 for establishing secure mobile communication is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 402, a packet is generated within a beacon with one or more identifiers and an indication of local time. In block 404, the beacon broadcasts the packet. In block 406, a mobile device with an enabled location-aware application receives the packet and determines the packet is associated with the location-aware application. In block 408, the mobile device sends the packet for authentication.

In block 410, a manager application on a backed server receives the packet for authentication. In block 412, the manager application extracts the inserted time and identifiers from the packet. In block 414, the manager application on the backend server authenticates the identifiers. In block 416, the manager application on the backend server verifies the packet was received for authentication within a window of time since packet generation. The window of time may be based on crowdsourcing latencies. For example, the authentication logic shown in FIG. 2 or a variation of the logic may be used. In block 418, the manager application on the backend server sends a response to the mobile device indicating whether the packet is valid.

Referring now to FIG. 5, one embodiment of a method 500 for configuring devices for mobile device communication is shown. For purposes of discussion, the steps in this embodiment are shown in sequential order. However, some steps may occur in a different order than shown, some steps may be performed concurrently, some steps may be combined with other steps, and some steps may be absent in another embodiment.

Multiple beacons placed in multiple different locations may need to be configured. The beacons may be located within a same store or general area identified by a major version include in beacon frames or packets. Alternatively, the beacons may be located across different areas. The steps described in blocks 504-516 may be performed for each location of multiple locations. A user may be programming logic in a manager application to perform the steps of configuration. The user may use a graphical user interface (GUI) that guides the user through the configuration process. Alternatively, the user may write program code to perform the steps.

In block 504, a transmitter device, such as a beacon using wireless technology, is directed at a given location to include an indication of time in packets being broadcast. In block 506, the transmitter device at the given location is directed to broadcast packets at a given rate, such as at a given time interval. In block 508, categories are selected for collecting crowdsourcing latencies for the given location. Examples of categories include cellular network providers, cellular network data rates, mobile device types distinguishing between laptops, smartphones, tablet computers, smartwatches and so forth; mobile device brand and model, user information of an owner of the mobile device, and so forth.

In block 510, history categories for collecting crowdsourcing latencies for the given location are selected. Examples of history categories may include an hour of the day, a day of the week, a month of the year and so forth. In block 512, event categories for collecting crowdsourcing latencies for the given location are selected. Examples of event categories may include particular recurring events such as different types of festivals, holidays, sporting events and other entertainment events and so forth. In block 514, one or more averaging formulas for determining crowdsourcing latencies for the given location are selected or defined. Weighted averages, absolute averages, moving averages and other statistical formulas may be used. In block 516, conditions or thresholds for using a given formula of the one or more formulas for the given location at a particular point-in-time are selected or defined. In block 518, a destination device to use the selected information for authenticating received packets is selected. The destination device may be the server or computer hosting the manager application. Alternatively, another computing device may be selected.

Turning now to FIG. 6, one embodiment of a method 700 for authenticating a received packet is shown. For purposes of discussion, the steps in this embodiment are shown in sequential order. However, some steps may occur in a different order than shown, some steps may be performed concurrently, some steps may be combined with other steps, and some steps may be absent in another embodiment.

In block 702, a packet is received including a first time indicating a time of generating the packet from a transmitter device located at a given location. In various embodiments, the transmitter device is a beacon using wireless technology and placed in a location for broadcasting signals for location-aware applications on mobile devices. In block 704, a second time is determined indicating a time of receiving the packet, such as a backend server or other computing device receiving the packet through a mobile device and a network.

In block 706, a packet latency is determined by finding a difference between the first time and the second time. In block 708, one or more of the first time and the second time is used along with a set of conditions for selecting a formula for determining crowdsourcing latency. This step may correlate with the use of the selection logic 220, and the tables 210 and 230 described earlier in FIG. 2. In block 710, a crowdsourcing latency is determined based on the selected formula. In block 712, the packet latency is compared with the crowdsourcing latency. In block 714, the received packet is verified whether it is valid based on the comparison.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A communication system comprising:
a transmitter device configured to broadcast a plurality of packets, wherein each of said packets indicates a time of broadcast;
a receiver device configured to receive the plurality of packets; and
a destination device configured to:
receive a given packet of the plurality of packets from the receiver device;
determine a first indication of time corresponding to receipt of the given packet;
extract a second indication of time from the given packet that corresponds to broadcast of the given packet from the transmitter device;
determine a first difference between the first indication of time and the second indication of time; and
in response to determining the first difference exceeds an expected latency, send a response to the receiver device indicating the given packet is invalid, wherein the expected latency is based at least in part on crowdsourcing information from a location of the transmitter device.

2. The communication system as recited in claim 1, wherein the crowdsourcing information comprises a moving average of latencies between the transmitter device and the destination device.

3. The communication system as recited in claim 1, wherein the crowdsourcing information comprises an absolute average of latencies between the transmitter device and the destination device.

4. The communication system as recited in claim 1, wherein the destination device is further configured to maintain expected latencies based on crowdsourcing information that corresponds to one or more of a particular time of day, a particular day of the week and a particular month.

5. The communication system as recited in claim 1, wherein the receiver device utilizes a given network carrier to convey packets, and wherein the expected latency is based at least in part on the given network carrier.

6. The communication system as recited in claim 1, wherein in response to determining the first difference is below a threshold latency, send a response to the receiver device indicating the given packet is invalid, wherein the threshold latency is based at least in part on the crowdsourcing information.

7. The communication system as recited in claim 1, wherein the destination device is further configured to determine a second difference different from the first difference using one or more of the following indications of time: a time the transmitter device generates the given packet, a time the receiver device receives the given packet, and a time the receiver device conveys the given packet.

8. The communication system as recited in claim 1, wherein the transmitter device is further configured to encrypt the given packet prior to conveyance to the destination device.

9. A method comprising:
broadcasting a plurality of packets from a transmitter device, wherein each of said packets indicates a time of broadcast;
receiving the plurality of packets at a receiver device configured to receive and convey packets;
receiving a given packet of the plurality of packets from the receiver device at a destination device;
determining a first indication of time corresponding to receipt of the given packet;
extracting a second indication of time from the given packet that corresponds to broadcast of the given packet from the transmitter device;
determining a first difference between the first indication of time and the second indication of time; and
in response to determining the first difference exceeds an expected latency, sending a response to the receiver device indicating the given packet is invalid, wherein the expected latency is based at least in part on crowdsourcing information from a location of the transmitter device.

10. The method as recited in claim 9, wherein the crowdsourcing information comprises a moving average of latencies between the transmitter device and the destination device.

11. The method as recited in claim 10, further comprising utilizes a given network carrier to convey packets, and wherein the expected latency is based at least in part on the given network carrier.

12. The method as recited in claim 9, wherein the crowdsourcing information comprises an absolute average of latencies between the transmitter device and the destination device.

13. The method as recited in claim 9, further comprising maintaining expected latencies based on crowdsourcing information that corresponds to one or more of a particular time of day, a particular day of the week and a particular month.

14. The method as recited in claim 9, wherein in response to determining the first difference is below a low expected latency less than the high expected latency, the method further comprises sending a response to the receiver device indicating the given packet is invalid, wherein the low expected latency is based at least in part on the crowdsourcing information.

15. The method as recited in claim 9, further comprising encrypting the given packet.

16. The method as recited in claim 9, wherein the transmitter device is a beacon device, the receiver device is a mobile computing device, and the destination device is a server.

17. A non-transitory computer readable storage medium comprising program instructions, wherein the program instructions are executable by a processor to:

broadcast a plurality of packets from a transmitter device, wherein each of said packets indicates a time of broadcast;

receive the plurality of packets at a receiver device configured to receive and convey packets;

receive a given packet of the plurality of packets from the receiver device at a destination device;

determine a first indication of time corresponding to receipt of the given packet;

extract a second indication of time from the given packet that corresponds to broadcast of the given packet from the transmitter device;

determine a first difference between the first indication of time and the second indication of time; and in response to determining the first difference exceeds an expected latency, send a response to the receiver device indicating the given packet is invalid, wherein the expected latency is based at least in part on crowdsourcing information from a location of the transmitter device.

18. The non-transitory computer readable storage medium as recited in claim 17, wherein the crowdsourcing information comprises a moving average of a plurality of latencies between the transmitter device and the destination device.

19. The non-transitory computer readable storage medium as recited in claim 18, wherein the program instructions are further executable to maintain expected latencies based on crowdsourcing information that corresponds to at least one or more of a particular time of day, a particular day of the week and a particular month.

20. The non-transitory computer readable storage medium as recited in claim 17, wherein the crowdsourcing information comprises an absolute average of latencies between the transmitter device and the destination device.

* * * * *